United States Patent

Lee et al.

[11] Patent Number: 5,760,675
[45] Date of Patent: Jun. 2, 1998

[54] PIEZORESISTIVE DEVICE AND FABRICATION METHOD THEREOF

[75] Inventors: Seong-Jae Lee, Seoul; Kyoung-Wan Park; Min-Cheol Shin, both of Daejeon, all of Rep. of Korea

[73] Assignee: Electronics and Telecommunications Research Institute, Daejeon, Rep. of Korea

[21] Appl. No.: 716,550

[22] Filed: Sep. 19, 1996

[30] Foreign Application Priority Data

Dec. 8, 1995 [KR] Rep. of Korea .......... 95-47862

[51] Int. Cl.$^6$ .......................................... G01L 1/22
[52] U.S. Cl. .................. 338/2; 338/42; 338/4; 338/36; 338/47
[58] Field of Search .................. 338/2, 3, 4, 5, 338/6, 36, 42, 43, 47; 73/721, 727

[56] References Cited

U.S. PATENT DOCUMENTS

| | | |
|---|---|---|
| 2,920,298 | 1/1960 | Hines .......................... 338/3 |
| 3,905,005 | 9/1975 | Hutchins, IV .................. 338/2 |
| 4,608,296 | 8/1986 | Keem et al. ................... 428/215 |
| 4,786,887 | 11/1988 | Bringmann et al. ............ 338/2 |
| 4,812,800 | 3/1989 | Fuchs et al. .................. 338/2 |
| 4,835,059 | 5/1989 | Kodato ......................... 428/432 |
| 4,894,635 | 1/1990 | Yajima et al. ................. 338/2 |
| 5,344,948 | 9/1994 | Verkade ........................ 556/551 |
| 5,581,226 | 12/1996 | Shah ............................ 338/42 |
| 5,652,394 | 7/1997 | Sugino et al. ................. 73/779 |

FOREIGN PATENT DOCUMENTS 58-139475  8/1983  Japan .......................... 338/2

*Primary Examiner*—Teresa J. Walberg
*Assistant Examiner*—Karl Easthom
*Attorney, Agent, or Firm*—Antonelli, Terry, Stout & Kraus, LLP

[57] ABSTRACT

Disclosed is the method of producing a piezo-device utilizing an ultra-thin Mo-C film as a piezoresistive material for a general class of improved piezo-device with the high sensitivity and the weak temperature dependence.

3 Claims, 1 Drawing Sheet

PIEZORESISTIVE DEVICE AND FABRICATION METHOD THEREOF

BACKGROUND OF THE INVENTION

1. Field of the Invention

The present invention relates to a piezoresistive device utilizing ultra-thin Mo-C films as a highly sensitive piezoresistive material and a fabrication method thereof.

2. Description of the Prior Art

Conventional piezoresistive device have used semiconductor as a piezoresistive material, for example, Si or Ge. But these simiconductors have intrinsically a low electron density and result in the serious temperature dependence, which complicates their applications for the piezo-devices.

In addition, since the contact resistance resulting from the contact surface of the metal used as the electrode of the piezoresistive device and the semiconductor material is high, the operating voltage is disadvantageously increased.

Generally, metals have much higher electron densities than semiconductors, leading to much weaker temperature dependence of electronic properties. But they show very little piezoresistive effect in bulk form. However, the piezoresistive effect can be enhanced when it is in the form of a ultra-thin film.

Therefore, a certain metallic material which is sensitive to the pressure and has a specific characteristic for the formation process of low contact resistance is desirable for a high-quality piezoresistive device.

Mo-C is a metallic compound but has a unique property of the stable formation in an ultra-thin film. Mo-C can be easily prepared as ultra-thin films of nominal thickness down to 0.15 nm with the electrical continuity. These properties can make Mo-C a good candidate for the piezoresistive material. The temperature dependence of the piezoresistive effect is weak in the Mo-C film as compared to the semiconducting material due to the metallic property and the sensitivity of the piezoresistive effect is very high when prepared as an ultra-thin film.

Given an external force on a film, the force per unit mono-layer increases with the inverse relation to the film's thickness and a larger strain results as the film becomes thinner, since there are fewer atoms to sustain the mechanical force acting on the film. Larger strain, in turn, means the larger displacement of the atoms involved from their equilibrium positions and it leads to a higher sensitivity for the piezoresistance, because the mean distance of the atoms are the crucial factor determining the electrical resistance of the material.

SUMMARY OF THE INVENTION

It is an object of the present invention to provide an improved piezoresistive device and the fabrication method thereof by using a new piesoresistive material of ultrathin Mo-C film.

To achieve the improved piezo-device, there is provided a structure of piezo-device, which includes two electrodes formed on a substrate for serving as a piezoresistive sensing part, having a gap between them, a piezoresistive member composed of an ultra-thin Mo-C film formed on said substrate, bridging the gap between two electrodes and a protective layer formed on the entire surface of said piezoresistive member.

To achieve the above objects, there is provided a fabrication method of the realization of the piezo-device, which includes the steps of forming two metallic electrodes on a substrate with a gap of the predefined size by lithographic technique, forming a ultra-thin Mo-C film as a piezoresistive member for bridging the gap to good contact with both electrodes, and forming a protective layer on the whole surface of the ultra-thin Mo-C film.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

This invention may be better understood and its object and advantage will become apparent to those skilled in the art by reference to the accompanying drawings as follows.

DETAILED DESCRIPTION OF THE INVENTION

We have found that an ultra-thin Mo-C film with a thickness as small as 0.15 nm still maintains an electrical continuity. The film can be prepared on insulating or semiconducting substrates of flat surface by the sputtering method using a Mo-C target directly, or by a reactive-sputtering method with a Mo target in an ambient of Ar/C2H2 mixture gas at a wide range of substrate temperature.

The electrically continuous and ultra-thin Mo-C film is very sensitive to a mechanical forces per unit area because it is ultra-thin and there are few atoms sustaining the force. When the Mo-C film has a thickness of only a few atomic distance, for example, about 1 nm, the extremely small mechanical stress/strain can change the atomic distances in the film significantly enough to affect the electrical conductivity of the film, because the distance between atoms is the crucial factor of the electrical conductivity for a given material. Therefore, this ultrathin Mo-C film can serve as an excellent piezoresistive material.

Another aspect of the Mo-C film which is crucial to a piezo-device is that the ultra-thin Mo-C can be easily prepared on substrates with any flat surfaces of insulator or semiconductor. The film's quality of piezoresistivity is very weakly dependent on the stoichiometry of $Mo_{0.5+x}C_{0.5-x}$ within the moderate range up to x=0.25 and the deposition temperature as well as the substrate. These properties are essential to the fabrication of the integrated circuits.

Figure 1:
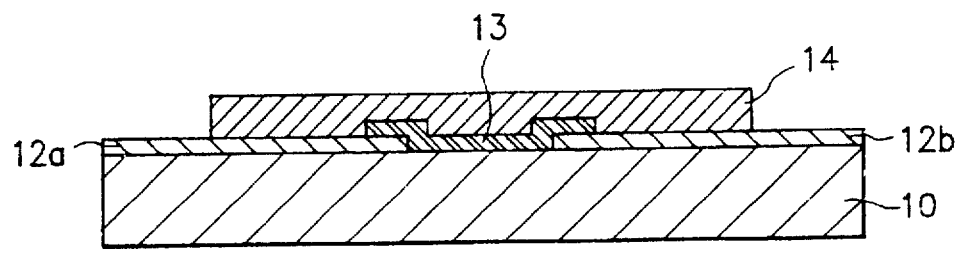
FIG. 1 is a cross-sectional view showing the construction of a piezo-device as a pressure sensor according to one embodiment of the present invention.

Referring to FIG. 1, the piezoresistive device according to one embodiment of the present invention comprises a substrate 10 as a support which is an insulating or semiconducting substrate such as a plastic foil, two electrodes 12a and 12b formed on the said substrate, the ultra-thin Mo-C film 13 formed on said substrate 10 with an appropriate lithographic technique, bridging the gap between two electrodes 12a and 12b for serving as a piezoresistive sensing part, and the insulating layer 14 encapsulating the whole Mo-C film 13. The insulating layer 14 serves as a protective layer against the oxydization of the Mo-C by the environment.

The piezoresistive member 13 is formed of an Mo-C having a thickness of 0.15 nm–5 nm. Here, since the Mo-C forms a piezoresistive layer, the resistance of the piezoresistive member 13 varies in accordance with a small variation of the pressure applied thereto, then the current flowing through the first electrode 12a and the second electrode 12b is varied with a constant voltage bias mode.

Namely, the piezoresistive member 13 is formed as a ultrathin film. So, when a certain pressure is applied to the piezoresistive member 13, since the number of atoms which support the pressure applied thereto is small, the strength that the unit atom receives becomes great. In this case, a certain displacement between atoms occurs, and then the resistance of the film is substantially varied.

The operational principles of the device shown in FIG. 1 are as follows; when a mechnical force is applied vertically on the planar surface of the device due to the pressure difference between upper and lower half spaces of the substrate 10, the device bends wholly or partly depending on the location of the firm support to which our device are bonded. This bending accompanies the displacements of atom in the Mo-C film 13 and the electronic resistance thereby. It will be clearly recognized that this device translates the pressure difference between the upper and lower parts of the layers involving a Mo-C film 13 into a variable resistance between the electrodes 12a and 12b.

The fabrication method of the piezo-device according to the present invention will now be described with reference to FIG. 2A through 2C.

Figure 2A:
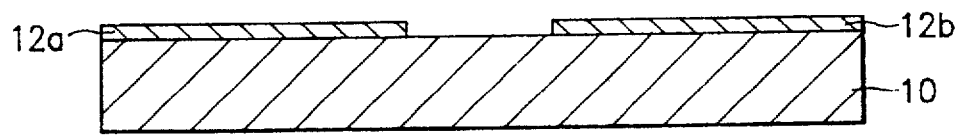
FIGS. 2A through 2C are cross-sectional views showing the fabrication processes of the device shown in FIG. 1.

Referring to FIG. 2A, two metallic electrodes 12a and 12b are deposited on an insulating or semiconducting substrate 10, with a predefined pattern having a gap between them by the use of the lithography technique.

Figure 2B:
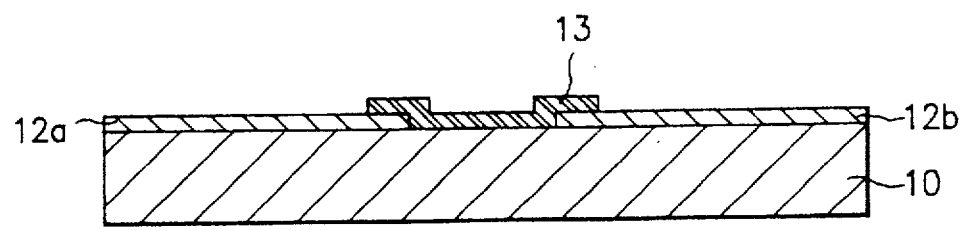

As a next step shown in FIG. 2B, the ultra-thin Mo-C film 13 is formed to bridge the gap between the said electrodes 12a and 12b with an appropriate lithographic technique(s). The deposition technique of the layer 13 can be either the direct sputtering method using a Mo-C target or the reactive sputtering method using a Mo-target in an atmosphere of the acetylene or the methane, where the substrate temperature during the deposition ranges from the ambient temperature to 500° C.

Figure 2C:
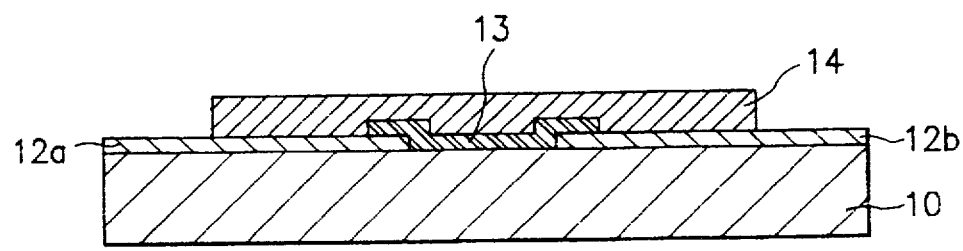

Thereafter, as shown in FIG. 2C, the protective layer 14 such as Si-C is deposited to encapsulate the whole surface of the Mo-C layer 13 in order to protect from the oxydization or the degradation of the Mo-C layer 13.

The piezoresistive device according to the present invention is directed to reducing the amount of current flowing through the electrodes 12a and 12b by forming a ultrathin film as a piezoresistive member, thus modulating the resistance itself in accordance with the variation of the distance between atoms of the piezoresistive member 13 when a small pressure is applied to the upper portion of the protective layer 14.

Therefore, since the piezoresistive device is very sensitive under a lower pressure condition, the same is adaptable to a ultra-small type and high sensitive transducer, a pressure gauge, and an accelerator. In addition, since the same is obtained in the deposition method and in the photolithography method, it can be used a sensor for an image recording system by fabricating an array by forming a plurality of piezoresistive devices on one substrate.

It is understood that various other modifications will be apparent to and can be readily made by those skilled in the art without departing from the scope and the spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A piezoresistive device, comprising:
   two electrodes formed on a substrate for serving as a pressure-sensing part, having a gap between them;
   a piezoresistive member composed of an ultra-thin metallic film formed on said substrate, bridging the gap between two electrodes; and
   a protective layer formed on the entire surface of said piezoresistive member,
   wherein said piezoresistive member is composed of a Mo-C film.

2. The device of claim 1, wherein said protective layer is composed of Si-C.

3. The device of claim 1, wherein said piezoresistive member has a thickness range from 0.15 nm to 5 nm.

* * * * *